United States Patent
Guo et al.

(10) Patent No.: US 12,099,371 B2
(45) Date of Patent: Sep. 24, 2024

(54) FAST CONTINUOUS REGULATION OF NONHOLONOMIC MOBILE ROBOTS

(71) Applicants: UBTECH NORTH AMERICA RESEARCH AND DEVELOPMENT CENTER CORP, Pasadena, CA (US); UBTECH ROBOTICS CORP LTD, Guangdong (CN)

(72) Inventors: Dejun Guo, San Gabriel, CA (US); Huan Tan, San Gabriel, CA (US)

(73) Assignee: UBKANG (QINGDAO) TECHNOLOGY CO., LTD., Shandong Province (CN)

( * ) Notice: Subject to any disclaimer, the term of this patent is extended or adjusted under 35 U.S.C. 154(b) by 371 days.

(21) Appl. No.: 17/338,874

(22) Filed: Jun. 4, 2021

(65) Prior Publication Data
US 2022/0397914 A1    Dec. 15, 2022

(51) Int. Cl.
*G05D 1/00*    (2024.01)
*G01C 22/00*   (2006.01)
*G01S 17/89*   (2020.01)

(52) U.S. Cl.
CPC .......... *G05D 1/0891* (2013.01); *G01C 22/00* (2013.01); *G01S 17/89* (2013.01); *G05D 1/0088* (2013.01); *G05D 1/0212* (2013.01); *G05D 1/08* (2013.01)

(58) Field of Classification Search
CPC .............. G05D 1/0891; G05D 1/0088; G05D 1/0212; G05D 1/08; G01C 22/00;
(Continued)

(56) References Cited

U.S. PATENT DOCUMENTS

| | | | | |
|---|---|---|---|---|
| 5,758,298 | A | * | 5/1998 | Guldner ............... G05D 1/0255 |
| 6,377,878 | B1 | * | 4/2002 | Feddema ............. G05D 1/0221 |
| 2013/0131910 | A1 | * | 5/2013 | Takahashi ............. G05D 1/024 |
| 2020/0130696 | A1 | * | 4/2020 | Xiao ...................... G01C 21/20 |

(Continued)

FOREIGN PATENT DOCUMENTS

| CN | 105500354 A | 4/2016 |
|---|---|---|
| CN | 109733384 A | 5/2019 |

(Continued)

OTHER PUBLICATIONS

International Search Report in related PCT Application No. PCT/CN2022/084269 dated Jun. 28, 2022 (4 pages).

(Continued)

*Primary Examiner* — Russell Frejd
*Assistant Examiner* — Ellis B. Ramirez
(74) *Attorney, Agent, or Firm* — Bayes PLLC

(57) ABSTRACT

Embodiments of the disclosure provide methods and systems for continuous regulation of a nonholonomic mobile robot. An exemplary method may include identifying a current pose of the nonholonomic mobile robot in a world frame, where the current pose is represented by a first set of values defining a first set of states of the nonholonomic mobile robot in the world frame; receiving a final goal pose of the nonholonomic mobile robot, where the final goal pose is represented by a second set of values defining a second set of states of nonholonomic mobile robot in the world frame; determining a moving path for moving the nonholonomic mobile robot from the current pose to the final goal pose; and controlling the nonholonomic mobile robot to move from the current pose to the final goal pose according to the moving path, where the nonholonomic mobile robot moves to the final goal pose by converging the nonholonomic mobile robot from the first set of states to the second set of states simultaneously.

19 Claims, 10 Drawing Sheets

(58) Field of Classification Search
CPC ..... G01C 21/20; G01C 21/3407; G01S 17/89; A47L 9/2805; A47L 2201/00
USPC .............................. 700/253, 255; 701/23, 26
See application file for complete search history.

(56) References Cited

U.S. PATENT DOCUMENTS

| | | | |
|---|---|---|---|
| 2021/0131822 A1* | 5/2021 | Artes | G01C 21/3848 |
| 2021/0132615 A1* | 5/2021 | Passot | G05D 1/0274 |
| 2021/0298552 A1* | 9/2021 | Couvignou | G05D 1/0212 |
| 2022/0317689 A1* | 10/2022 | Li | B60L 53/37 |

FOREIGN PATENT DOCUMENTS

| | | | | |
|---|---|---|---|---|
| CN | 110440823 | | 11/2019 | |
| CN | 111060108 | A | 4/2020 | |
| CN | 111413969 | | 7/2020 | |
| CN | 111750859 | A | 10/2020 | |
| CN | 112714729 | A | 4/2021 | |
| EP | 3369627 | A1 * | 9/2018 | ............. B60R 21/00 |
| EP | 3922949 | A1 * | 12/2021 | ......... G01C 21/3415 |
| JP | 2021062738 | A | 4/2021 | |
| WO | WO-2021220103 | A1 * | 11/2021 | ............... A61H 3/04 |

OTHER PUBLICATIONS

Written Opinion in related PCT Application No. PCT/CN2022/084269 dated Jun. 28, 2022 (4 pages).

Branicky MS. Multiple Lyapunov Functions and Other Analysis Tools for Switched and Hybrid Systems. IEEE Transactions on Automatic Control. Apr. 1998; 43(4):475-82.

Tian YP, Li S. Exponential Stabilization of Nonholonomic Dynamic Systems by Smooth Time-varying Control. Automatica. Jul. 1, 2002; 38(7):1139-46.

Yuan H, Qu Z. Continuous Time-varying Pure Feedback Control for Chained Nonholonomic Systems with Exponential Convergent Rate. IFAC Proceedings vols. Jan. 1, 2008; 41(2):15203-8.

Oriolo G, De Luca A, Vendittelli M. WMR Control Via Dynamic Feedback Linearization: Design, Implementation, and Experimental Validation. IEEE Transactions on Control Systems Technology. Dec. 10, 2002; 10(6):835-52.

Aguiar AP, Atassi AN, Pascoal AM. Regulation of a Nonholonomic Dynamic Wheeled Mobile Robot with Parametric Modeling Uncertainty Using Lyapunov Functions. InProceedings of the 39th IEEE Conference on Decision and Control (Cat. No. 00CH37187) Dec. 12, 2000 (vol. 3, pp. 2995-3000). IEEE.

* cited by examiner

FAST CONTINUOUS REGULATION OF NONHOLONOMIC MOBILE ROBOTS

TECHNICAL FIELD

The present disclosure relates to methods and systems for mobile robot navigation and parking, and more specifically, relates to methods and systems for fast continuous regulation of nonholonomic mobile robots for fast and precise parking.

BACKGROUND

Underactuated systems are mechanical control systems with fewer controls than the number of configuration variables. Exemplary underactuated systems include flexible-link robots, mobile robots, walking robots, robots on mobile platforms, cars, locomotive systems, snake-type and swimming robots, acrobatic robots, aircraft, spacecraft, helicopters, satellites, surface vessels, underwater nonholonomic mobile robots, etc. Due to their broad applications in robotics, aerospace nonholonomic mobile robots, and marine nonholonomic mobile robots, control of underactuated systems becomes an attractive field in recent years. However, due to the under-actuation (i.e., the number of inputs is smaller than the degree of freedom or configuration variables), it is challenging to design a regulation controller that stabilizes the underactuated systems. Existing methods for controlling underactuated systems are focused on switching control methods that require underactuated systems to switch between controllers, which are time-consuming and inefficient. Other methods for controlling underactuated systems include certain continuous regulation control methods, which do not consider converging accuracy, transition goal poses, moving backward, and certain other factors, and thus are also inefficient. It is also difficult for the underactuated system under such control to achieve a natural, smooth, and precise parking under certain circumstances.

Accordingly, there is a need to develop methods and systems for efficient control of underactuated systems for fast, natural, smooth, and precise parking.

SUMMARY

Embodiments of the disclosure provide a method for continuous regulation of a nonholonomic mobile robot. An exemplary method may include identifying a current pose of the nonholonomic mobile robot in a world frame, where the current pose is represented by a first set of values defining a first set of states of the nonholonomic mobile robot in the world frame. The exemplary method may also include receiving a final goal pose of the nonholonomic mobile robot, where the final goal pose is represented by a second set of values defining a second set of states of nonholonomic mobile robot in the world frame. The exemplary method may additionally include determining a moving path for moving the nonholonomic mobile robot from the current pose to the final goal pose. The exemplary method may additionally include controlling the nonholonomic mobile robot to move from the current pose to the final goal pose according to the moving path, where the nonholonomic mobile robot moves to the final goal pose by converging the nonholonomic mobile robot from the first set of states to the second set of states simultaneously.

Embodiments of the disclosure also provide a system for continuous regulation of a nonholonomic mobile robot. Such an exemplary system may include at least one processor, and a memory coupled to the at least one processor, where the memory stores programs that, when executed, cause the at least one processor to identify a current pose of the nonholonomic mobile robot in a world frame, where the current pose is represented by a first set of values defining a first set of states of the nonholonomic mobile robot in the world frame. The at least processor may also receive a final goal pose of the nonholonomic mobile robot, where the final goal pose is represented by a second set of values defining a second set of states of nonholonomic mobile robot in the world frame. The at least one processor may additionally determine a moving path for moving the nonholonomic mobile robot from the current pose to the final goal pose. The at least one processor may additionally control the nonholonomic mobile robot to move from the current pose to the final goal pose according to the moving path, where the nonholonomic mobile robot moves to the final goal pose by converging the nonholonomic mobile robot to the second set of states simultaneously.

Embodiments of the disclosure further provide a nonholonomic mobile robot. An exemplary nonholonomic mobile robot may include a processor and a controller coupled to the processor. The processor may be configured to identify a current pose of the nonholonomic mobile robot in a world frame, where the current pose is represented by a first set of values defining a first set of states of the nonholonomic mobile robot in the world frame. The processor may be also configured to receive a final goal pose of the nonholonomic mobile robot, where the final goal pose is represented by a second set of values defining a second set of states of nonholonomic mobile robot in the world frame. The processor may be additionally configured to determine a moving path for moving the nonholonomic mobile robot from the current pose to the final goal pose. The controller may be configured to control the nonholonomic mobile robot to move from the current pose to the final goal pose according to the moving path, where the nonholonomic mobile robot moves to the final goal pose by converging the nonholonomic mobile robot to the second set of states simultaneously.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

DETAILED DESCRIPTION

Figure 1A:
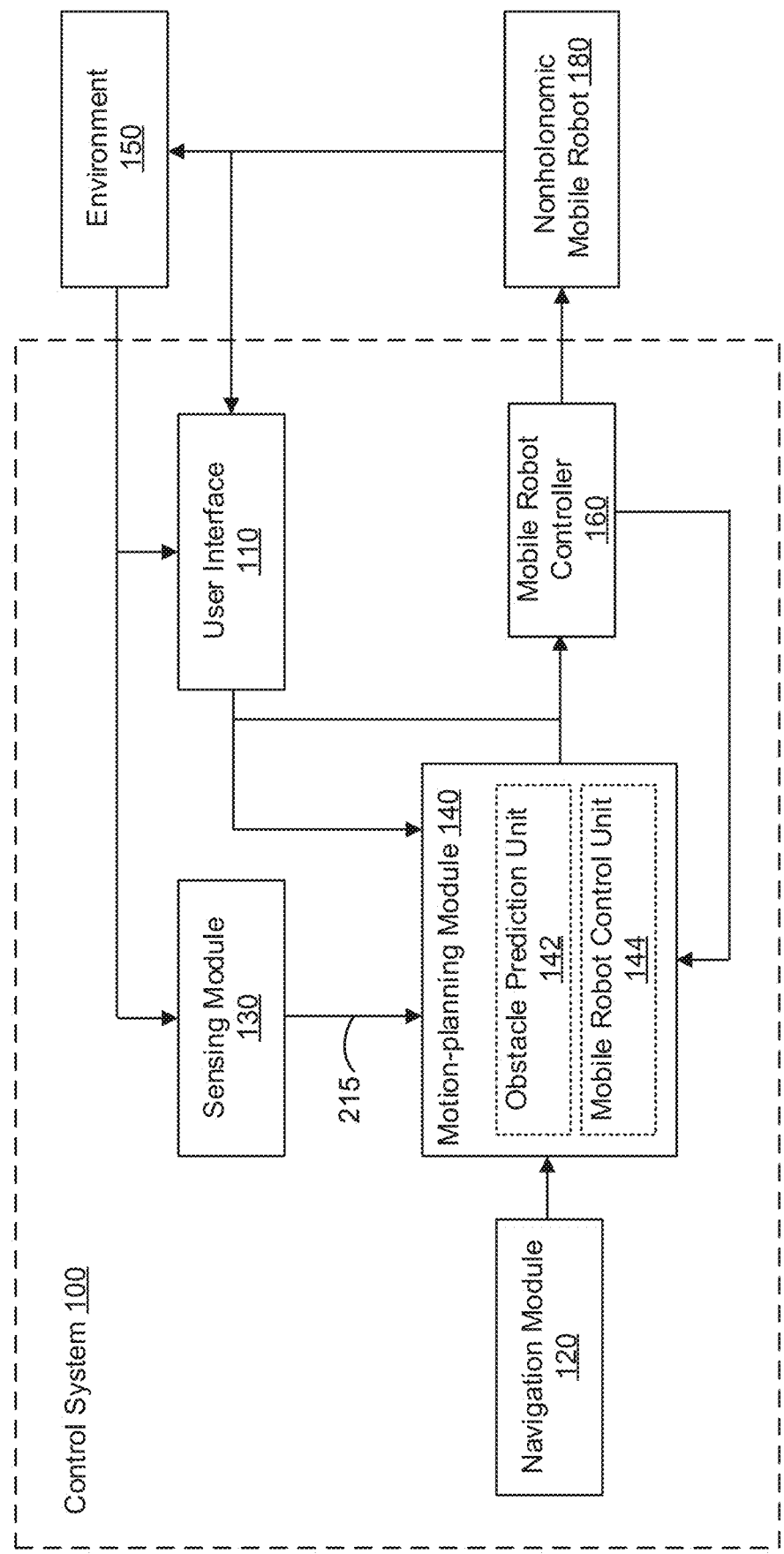
FIG. 1A illustrates a block diagram of an exemplary control system coupled to a nonholonomic mobile robot, according to embodiments of the disclosure.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high level, without detail, to avoid unnecessarily obscuring aspects of the present teachings. In the following material, directional terms, such as "forward," "backward," "left," or "right" are used to indicate a relative direction and merely to provide a frame of reference during the following discussion. They are not intended to indicate a required, desired, or intended orientation of the described articles.

As previously described, existing methods for controlling underactuated systems have certain technical limitations. For instance, some existing methods are focused on switching control methods that require multiple controllers to be deployed and require underactuated systems to switch between the multiple controllers, which become time-consuming and inefficient. Other existing methods include certain continuous regulation control methods, which do not consider converging accuracy and certain challenging situations such as abrupt changes in rotational motion and thus are also inefficient. It is very difficult for the underactuated system under such controls to achieve a fast and precise parking. Therefore, existing methods for controlling underactuated systems have certain technical limitations.

Technical solutions for enabling a fast and precise parking of an underactuated system with nonholonomic constraints are provided in the present disclosure. In implementations, a motion-planning process may be employed to determine the current pose (or initial pose) and a final goal pose of the underactuated system, where each of the current pose and the final goal pose is represented by a set of values defining a set of states (e.g., translations on x- and y-axes and orientation (yaw angle)) of the underactuated system in a world frame. Based on the current pose and final goal pose, the motion-planning process may determine a moving path for moving the underactuated system from the current pose to the final goal pose. After determining the moving path, the underactuated system may be controlled to move from the current pose to the final goal pose following the moving path. When the underactuated system is controlled to move to the final goal pose, the underactuated system is controlled to converge to a set of states corresponding to the final goal pose simultaneously. By converging to the set of states simultaneously, the underactuated system does not need to switch between different controllers, thereby saving time and increasing the efficiency of the underactuated system.

In some implementations, when determining the moving path, it may be also determined whether a transition goal pose is needed for an underactuated system to move from the current pose to the final goal pose. In certain situations, by introducing a transition goal pose, the underactuated system may be controlled to move to the transition goal pose first before moving to the final goal pose. This may then prevent an abrupt change in the rotational motion of the underactuated system. In some implementations, when determining the moving path, it may be further determined whether the underactuated system needs to move backward when moving into the final goal pose (or when moving into the transition goal pose if there is one). Consistent throughout the present disclosure, moving backward or a backward motion describes that the mobile robot faces away from the goal pose while moving towards and into the goal pose. In other words, the mobile robot backs into the goal pose rather than heading into it. By enabling the underactuated system to back into the goal pose, not just moving forward, the motion of the underactuated system becomes more natural and smoother when compared to merely moving forward. Accordingly, the technical solutions described in the present disclosure may allow an underactuated system to achieve a fast, natural, smooth, and precise parking, and thus solve the technical problems faced by the existing methods.

In the following discussion, an example illustration of a nonholonomic mobile robot that may employ the techniques described herein is provided. It is to be noted that the application of the techniques described herein is not limited to the described nonholonomic mobile robot but can be extended to any underactuated system with nonholonomic constraints.

FIG. 1A illustrates a block diagram of an exemplary control system 100 for controlling a nonholonomic mobile robot 180 according to some embodiments of the disclosure. Nonholonomic mobile robot 180 may be any type of mobile robot with nonholonomic constraints. In some embodiments, nonholonomic mobile robot 180 may be an autonomous robot equipped with an autonomous system. Alternatively, nonholonomic mobile robot 180 may also receive external inputs from user interface 110 overriding the commands of control system 100. In such embodiments, the nonholonomic mobile robot is a semi-autonomous robot. As one example, nonholonomic mobile robot 180 may be a unicycle-like car. Another example of a possible nonholonomic mobile robot is a differential-drive mobile robot, or an unmanned aerial nonholonomic mobile robot.

Control system 100 may include a navigation module 120 for determining a pose of nonholonomic mobile robot 180 in a world frame (e.g., a map frame). Navigation module 120 may use different techniques in determining a pose of nonholonomic mobile robot 180. In one example, navigation module 120 may include a wheel odometry combined with a Light Detection and Ranging (LiDAR)-based Simultaneous Localization and Mapping (SLAM) to localize a mobile robot's current pose or initial pose. In some embodiments, SLAM algorithms included in navigation module 102 may allow a map frame (e.g., a world frame) to be built and a nonholonomic mobile robot to be localized (e.g., at specific x- and y-axes and orientation) in the map at the same time. Based on the localization information, a moving path may be determined for the nonholonomic mobile robot on the map. In some embodiments, SLAM algorithms included in navigation module 102 may further map out unknown environments, which may be applied to path planning and obstacle avoidance under certain circumstances. In some embodiments, navigation module 102 may also provide state information of nonholonomic mobile robot 180, including x- and y-axes and orientation and/or other localization-related information to other components of control system 100 as described later.

Control system 100 may also include a motion-planning module 140 for computing an incoming moving path (may be also referred to as "predicted motion") of nonholonomic mobile robot 180. In some embodiments of the disclosure, motion-planning module 140 may iteratively determine states of the nonholonomic mobile robot moved to a current pose from previous pose(s) having the states determined during previous iteration(s) and determine an incoming moving path for moving of the nonholonomic mobile robot to a final goal pose based on the states of the nonholonomic mobile robot at the current pose. In some embodiments, motion-planning module 140 may communicate with other components of control system 100, such as user interface 110 and navigation module 120 in determining the incoming moving path of the nonholonomic mobile robot.

In some embodiments, motion-planning module 140 may determine the incoming moving path of the nonholonomic mobile robot by determining whether a transition goal pose is needed when moving the nonholonomic mobile robot to the final goal pose. Under certain circumstances (e.g., when the final goal pose is on the left or right side near the current pose), moving the nonholonomic mobile robot directly to the final goal pose may require a too large rotation torque of the nonholonomic mobile robot due to the abrupt change in rotational motion, which then leads to an unstable/unnatural motion of the nonholonomic mobile robot. By introducing a transition goal pose along the incoming moving path, the nonholonomic mobile robot can move along a zig-zag path. Accordingly, the nonholonomic mobile robot does not need to provide large rotation torque, which then leads to a smoother and more natural motion of the nonholonomic mobile robot. Specific details for determining whether a transition goal pose is needed will be described later in FIG. 3.

In some embodiments, motion-planning module 140 may determine the incoming moving path of the nonholonomic mobile robot by determining whether to move the nonholonomic mobile robot backward so that the nonholonomic mobile robot backs into the final goal pose rather than heading into the final goal pose. Under certain circumstances, moving a nonholonomic mobile robot backward to the final goal pose may result in a more natural and more direct motion of the nonholonomic mobile robot. That is, by enabling a nonholonomic mobile robot to move backward, a shorter and more natural and direct path may be achieved when comparing to merely moving the nonholonomic mobile robot forward. Specific detail for determining whether to move a nonholonomic mobile robot backward will be described later in FIG. 4.

In some embodiments, in addition to the current pose and the final goal pose, motion-planning module 140 may additionally receive information about an environment 150 surrounding the nonholonomic mobile robot or along the incoming moving path, such as obstacles, drivable, non-drivable, or illegal areas for the nonholonomic mobile robot. Information may be received from sensors included in sensing module 130 of control system 100. The information about environment 150 may be represented by a map. In some embodiments, motion-planning module 140 may also receive information about the nonholonomic mobile robot motion from a mobile robot controller 160 included in control system 100. The information may include states of the nonholonomic mobile robot, such as position, heading, velocity, etc., and is received either from hardware or software, connected directly or remotely to motion-planning module 140.

Based on the information received from mobile robot controller 160 and sensing module 130, motion-planning module 140 may determine the incoming moving path for the nonholonomic mobile robot that reaches the final goal pose and avoids collision and restricted areas that the mobile robot cannot travel in. In some embodiments, when determining the incoming moving path, besides the moving route connecting the initial pose and the final goal pose, certain motion parameters for moving the nonholonomic mobile robot may be also determined. These motion parameters may include, but are not limited to, velocity, orientation/heading, rotational velocities, angular speed, accelerations, steering, brake, and engine torques.

In some embodiments of the disclosure, motion-planning module 140 may include an obstacle prediction unit 142 for obstacle prediction based on motions of obstacles received by the motion-planning module. For instance, in response to detecting an obstacle on the determined incoming moving path of the nonholonomic mobile robot, some embodiments of the disclosure may compute a modified moving path of the nonholonomic mobile robot to avoid that obstacle. For example, the obstacle may be a physical obstacle such as another nonholonomic mobile robot or a pedestrian, or a virtual obstacle representing illegal driving behavior, such as the line delimiting the allowed driving lane, and so on. In some embodiments, to determine whether a modified moving path is necessary, the predicted incoming moving path is vetted for possible collision with obstacles, and the incoming moving path predicted to collide with an obstacle is modified.

In some embodiments, once determined and/or modified, the incoming moving path may be input into mobile robot controller 160 to compute mobile robot commands, such as steering, brake, throttle, and so on. Those commands are submitted to the actuators of the nonholonomic mobile robot to move the nonholonomic mobile robot according to the predicted or modified moving path. In some embodiments, motion-planning module 140 may further include a mobile robot control unit 144 for computing the motion included in the incoming moving path. Therefore, the motion computed by motion-planning module 140 may be accurately executed by mobile robot controller 160. For example, mobile robot controller 160 may include one or more of a steering controller, a brake controller, and a throttle controller, and motion-planning module 140 may include models emulating the operations of those controllers. Specific detail about motion-planning module 140 and controller 160 will be described further in connection with FIG. 1B.

Figure 1B:
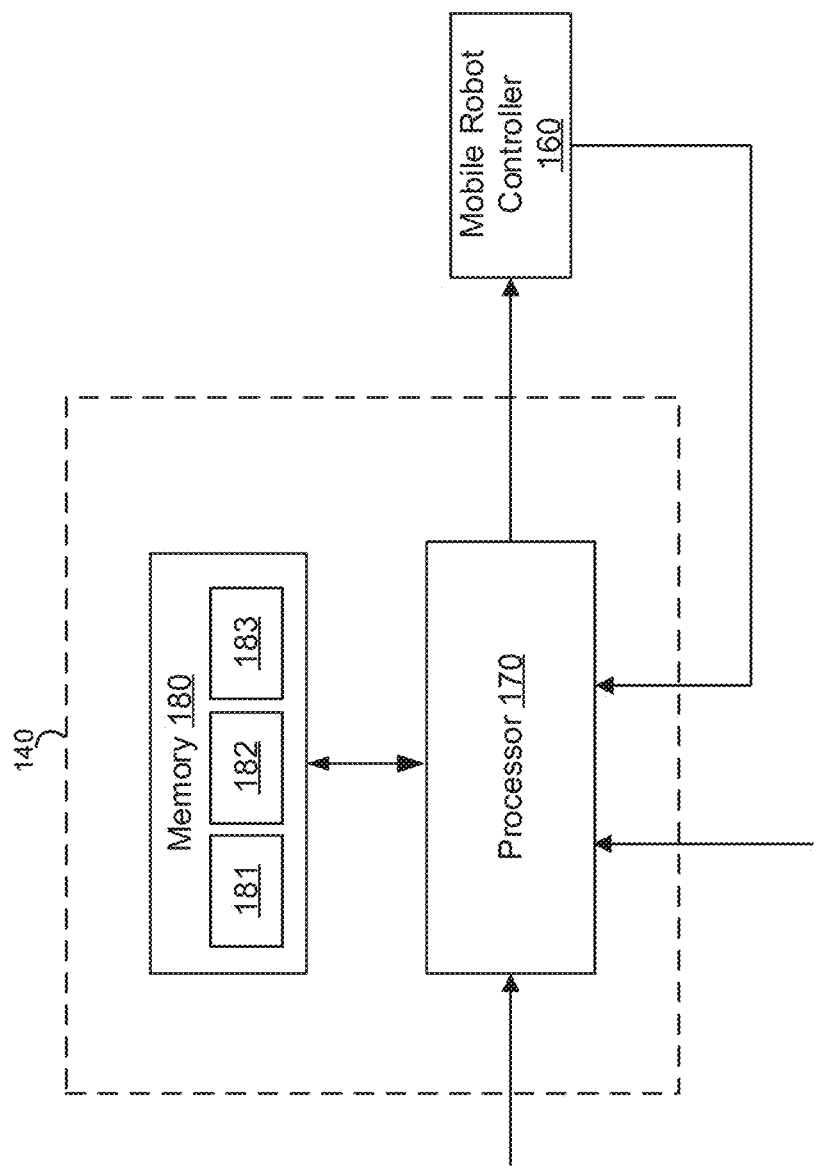
FIG. 1B illustrates a block diagram of an exemplary motion-planning module included in a control system, according to embodiments of the disclosure.

FIG. 1B illustrates a block diagram of an example motion-planning module 140 according to one embodiment of the disclosure. As illustrated, motion-planning module 140 may include at least one processor 170 for executing modules/units of the motion-planning module. Processor 170 may be connected to a memory 180 that stores a map 181 of environment 150 and information 182 about the nonholonomic mobile robot. Memory 180 may also store internal information 183 of motion-planning module 140, including but are not limited to the predicted and/or modified moving paths, values of each computed state, the motion leading up to each state, future predicted motions of obstacles, etc. In some embodiments, the information about the nonholonomic mobile robot and the environment may be updated based on the information received from controller 160 and the information received from sensing module 130. In some embodiments, memory 180 may also store algorithms and program instructions executable by processor 170 for determining the incoming moving path, including the moving route and the motion parameters as described more in detail in FIGS. 2-8.

Figure 2:
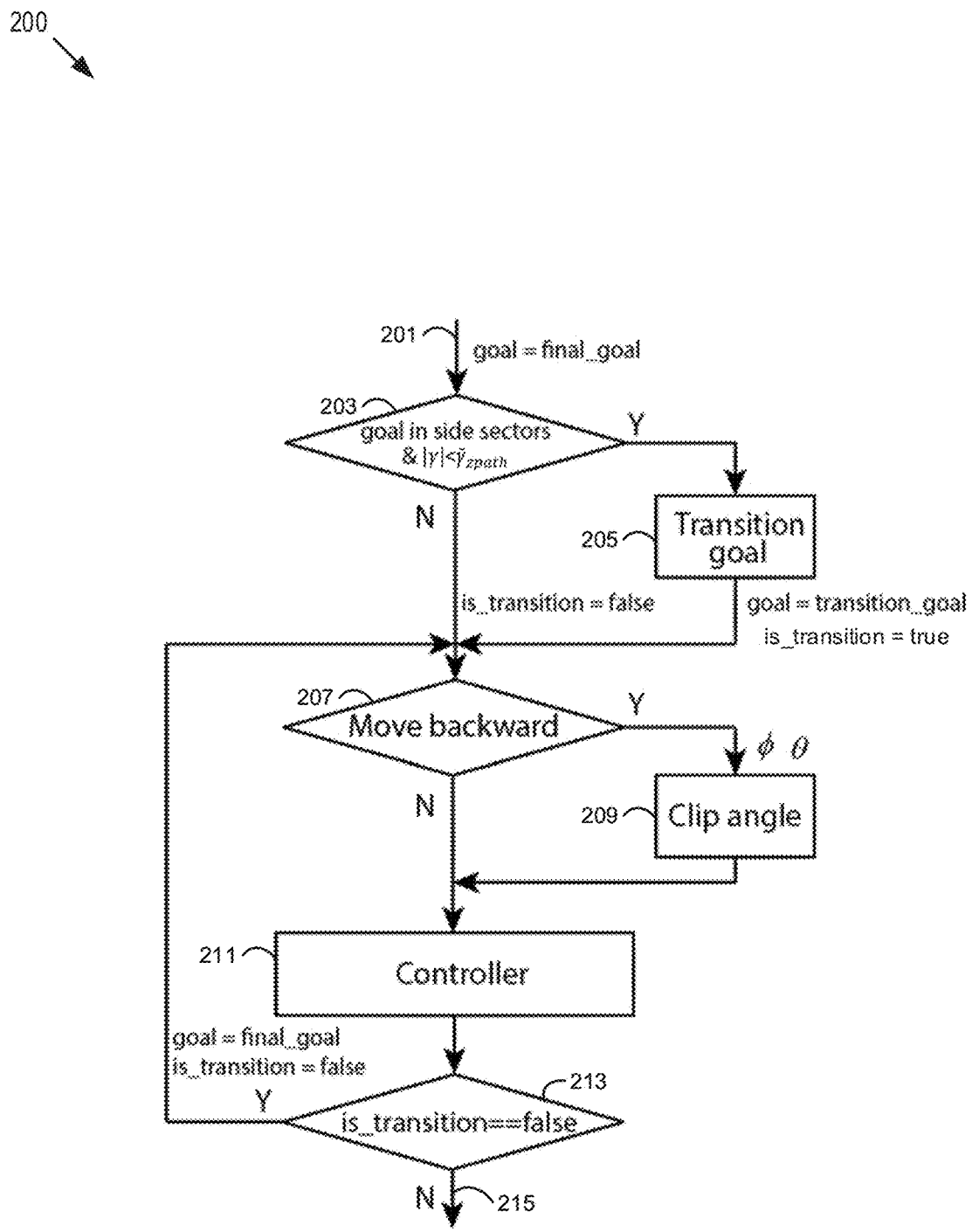
FIG. 2 shows a flow chart of an exemplary method for determining a moving path of a nonholonomic mobile robot, according to embodiments of the disclosure.

FIG. 2 shows a flow chart of an exemplary method 200 for determining a moving path of a nonholonomic mobile robot, according to embodiments of the disclosure. The exemplary method may be implemented by motion-planning module 140 of control system 100 based on the information stored in memory 180.

Assuming that the current pose or the initial pose of a nonholonomic mobile robot (e.g., nonholonomic mobile robot 180) in the world frame is (x, y, $\psi$) (including coordinates on x- and y-axes and orientation angle $\psi$), at step 201, a final goal pose of the nonholonomic mobile robot may be received, where the final goal pose in the world frame may be represented by ($x_g$, $y_g$, $\psi_g$). In some embodiments, the current pose may be determined by the navigation module 120 as previously described and the final goal pose may be received based on external inputs received from a user via user interface 110. In some embodiments, the current pose and the final goal pose may be also determined from other means. For instance, the final goal pose may be determined based on the routine schedule or based on information received from other terminals including other neighboring nonholonomic mobile robots. After determining the current pose and the final goal pose, the position error e and the orientation error $\gamma$ between the current pose and the final goal pose may be determined accordingly. For instance, the position error e between the current pose and the final goal pose in the world frame may be $e=\sqrt{(x-x_g)^2+(y-y_g)^2}$ and the orientation error $\gamma$ between the current pose and the final goal pose in the world frame may be $\gamma=\psi-\psi_g$.

Next, it may be determined whether a transition goal pose is needed for the nonholonomic mobile robot to move to the final goal pose along a zig-zag path. By introducing a transition goal pose along the moving path, a large rotating torque can be avoided. To determine whether a transition goal pose is needed, at step 203, motion-planning module 140 may determine whether the absolute value of the orientation error $|\gamma|$ is smaller than a threshold $\bar{\gamma}_{zpath}$ and the final goal pose is located in one of side sectors as further described below in FIG. 3.

Figure 3:
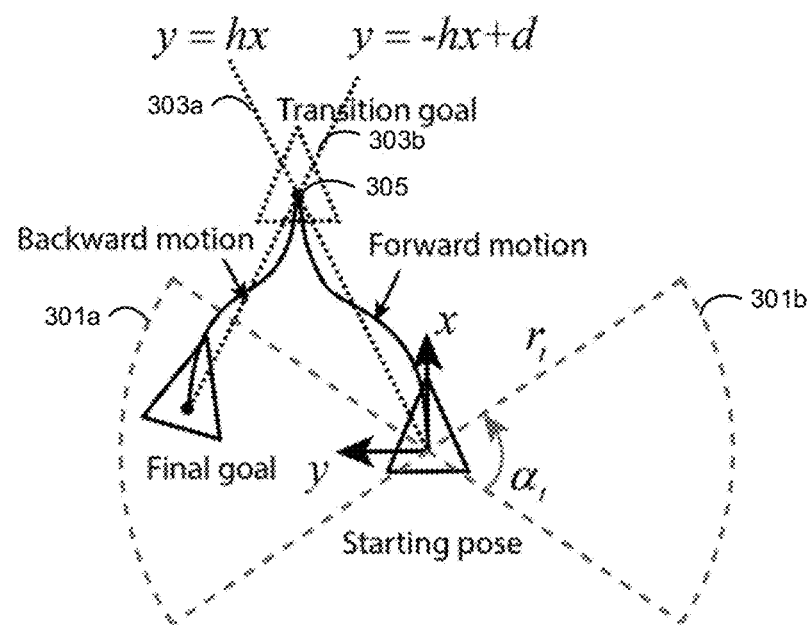
FIG. 3 illustrates a schematic diagram of an exemplary scenario for determining a transition goal pose, according to embodiments of the disclosure.

FIG. 3 illustrates a schematic diagram of an exemplary scenario 300 for determining a transition goal pose, according to embodiments of the disclosure. In some embodiments, to determine whether a nonholonomic mobile robot needs to move to a transition goal pose before moving to the final goal pose, one or more arc-shaped sectors may be defined for the nonholonomic mobile robot. When the absolute value of the orientation error $|\gamma|$ is smaller than the threshold $\bar{\gamma}_{zpath}$ and the final goal pose is located within a defined sector, the nonholonomic mobile robot then needs to move to a transition goal pose before moving to the final goal pose. For instance, for the exemplary scenario shown in FIG. 3, the final goal pose is located within a sector 301a located on the left side of the nonholonomic mobile robot at the current pose. At this point, motion-planning module 140 may determine to move the nonholonomic mobile robot to a transition goal pose first before moving the robot to the final goal pose if the absolute value of the orientation error $|\gamma|$ is also smaller than the threshold $\bar{\gamma}_{zpath}$. Here, the threshold $\bar{\gamma}_{zpath}$ may be predefined or determined through other means.

In some embodiments, a predefined arc-shaped sector may have a specific radius $r_t$ and angle $\alpha_t$, as shown in FIG. 3. The values of radius $r_t$ and/or angle $\alpha_t$ may be defined according to the motion capacity of the nonholonomic mobile robot, shape, and/or size of the nonholonomic mobile robot, among other factors. For instance, the smaller the size of the nonholonomic mobile robot, the smaller the radius $r_t$. In some embodiments, values of radius $r_t$ and/or angle $\alpha_t$ may be also dynamically updated based on the environmental situations. For instance, if there are some obstacles in the environment, the values of radius $r_t$ and/or angle $\alpha_t$ may be dynamically modified to avoid areas where the obstacles are located. In some embodiments, one or more sensors included in sensing module 130 may obtain the obstacle information. In some embodiments, the obstacle information may be obtained from other readily available sources, e.g., from certain third-party maps including three-dimensional (3D) maps. In some embodiments, values of radius $r_t$ and/or angle $\alpha_t$ may be predefined by a user through user interface 110.

In some embodiments, more than one sector may be defined for a nonholonomic mobile robot at the current pose. For instance, as shown in FIG. 3, there may be two sectors 301a and 301b predefined for the nonholonomic mobile robot. The two sectors may be symmetric with respect to the forward direction (i.e., the x-axis shown in FIG. 3) of the nonholonomic mobile robot at the current pose. In addition, the two sectors may be centered with respect to the y-axis of the nonholonomic mobile robot at the current pose. That is, the centerline of each sector is aligned with the y-axis of the nonholonomic mobile robot at the current pose, as shown in FIG. 3. In some embodiments, the two sectors may be not necessarily symmetric. For instance, due to the existence of obstacles on one side, one sector may be smaller than the other sector. Other environment information may also affect the size of each sector defined for the nonholonomic mobile robot.

In some embodiments, after determining that a transition goal pose is needed for the nonholonomic mobile robot to move to the final goal pose, motion-planning module 140 may further determine the states of the transition goal pose, so as to determine the moving route and motion parameters for moving the nonholonomic mobile robot to the transition goal pose first. To determine the states of the transition goal pose, motion-planning module 140 may first define a line (e.g., a dashed line 303a in FIG. 3) represented by y=hx with a slope h. Line 303a may be represented in a world frame, e.g., in a robot frame fixed at the current pose. The final goal pose may be then defined in the same robot frame by ($x_\alpha$, $y_\alpha$). Next, motion-planning module 140 may identify another line (e.g., a dashed line 303b in FIG. 3) represented by y=−hx+d crossing through the final goal pose with the opposite slope. An intersection point between line 303a and line 303b may define the x- and y-axes of the transition goal pose.

In some embodiments, the slope h in y=hx and y=−hx+d may be tuned by a user through user interface 110, may be predefined and have a fixed value, may be defined based on the position error e between the current pose and the final goal pose, or may be determined from other means. For instance, when the position error e between the current pose and the final goal pose becomes larger, the slope h may become smaller. In some embodiments, the slope h may also relate to the size of the nonholonomic mobile robot. For instance, the larger the size of the nonholonomic mobile robot, the smaller the slope h. In some embodiments, the value of d may be defined as a function of $(x_\alpha, y_\alpha)$, as shown below in Table 1. After defining the values of h and d, the x- and y-axes of the transition goal pose (which may be also referred to as "transition point P") may be then obtained, as shown in the following Table-1:

TABLE 1

|  | $y_a \geq 0$ | $y_a < 0$ |
|---|---|---|
| $x_a \geq 0$ | $y = hx$<br>$y = -hx + d$<br>$d = x_a h + y_a,$<br>$P = \left(\dfrac{d}{2h}, \dfrac{d}{2}\right)$ | $y = -hx$<br>$y = hx + d$<br>$d = -x_a h + y_a,$<br>$P = \left(-\dfrac{d}{2h}, \dfrac{d}{2}\right)$ |
| $x_a < 0$ | $y = -hx$<br>$y = hx + d$<br>$d = -X_a h + y_a,$<br>$P = \left(-\dfrac{d}{2h}, \dfrac{d}{2}\right)$ | $y = hx$<br>$y = -hx + d$<br>$d = X_a h + y_a,$<br>$P = \left(\dfrac{d}{2h}, \dfrac{d}{2}\right)$ |

In some embodiments, motion-planning module 140 may also determine the orientation of the transition goal pose. For instance, motion-planning module 140 may use the orientation of the current pose (as shown in FIG. 3) or the orientation of the final goal pose as the orientation of the transition goal pose. Alternatively, an average value between the orientation of the current pose and the orientation of the final goal pose may be used as the orientation of the transition goal pose. Other approaches for determining the orientation of the transition goal pose may be also possible and contemplated. In some embodiments, after determining the transition goal pose, motion-planning module 140 may plan to move the nonholonomic mobile robot first to the transition goal pose before moving it to the final goal pose.

Referring back to FIG. 2, if the nonholonomic mobile robot needs to move to the transition goal pose along a zig-zag path as illustrated in FIG. 3, the goal of the incoming motion or predicted motion of the nonholonomic mobile robot will be the transition goal. That is, "goal=transition_goal" and "is_transition=true." However, if it is determined that the nonholonomic mobile robot does not need to move along a zig-zag path (e.g., when the final goal pose is not located in any of the defined sectors in FIG. 3), the nonholonomic mobile robot may then directly move to the final goal pose. At this moment, "is_transition=false" and "goal=final_goal." That is, the goal of the incoming motion or predicted motion of the nonholonomic mobile robot will be the final goal.

After determining the goal (either transition_goal or final_goal) of the predicted motion, at step 207, motion-planning module 140 may determine whether to move the holonomic mobile robot backward in the predicted motion. Thanks to the capacity of backward motion instead of merely forward motion, the nonholonomic mobile robot may be enabled to move smoother and more naturally.

Figure 4:
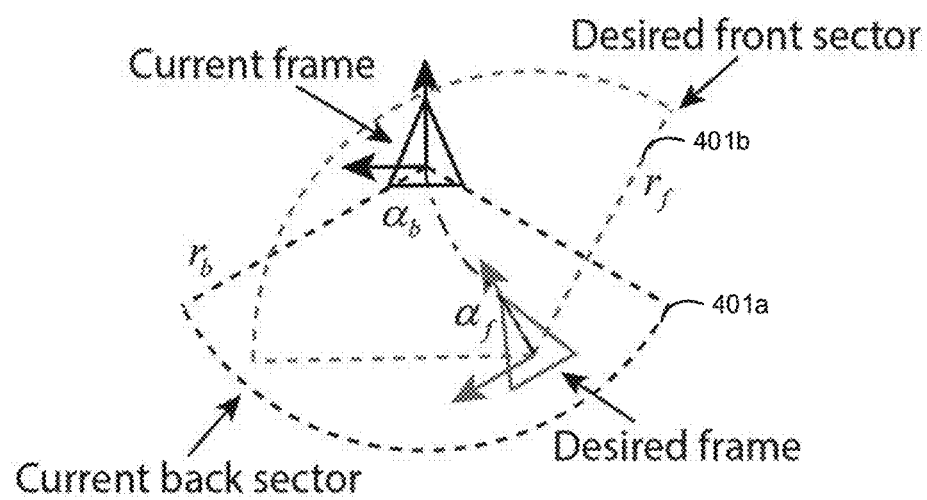
FIG. 4 illustrates a schematic diagram of an exemplary scenario for determining whether a nonholonomic mobile robot needs to move backward, according to embodiments of the disclosure.
Figure 5:
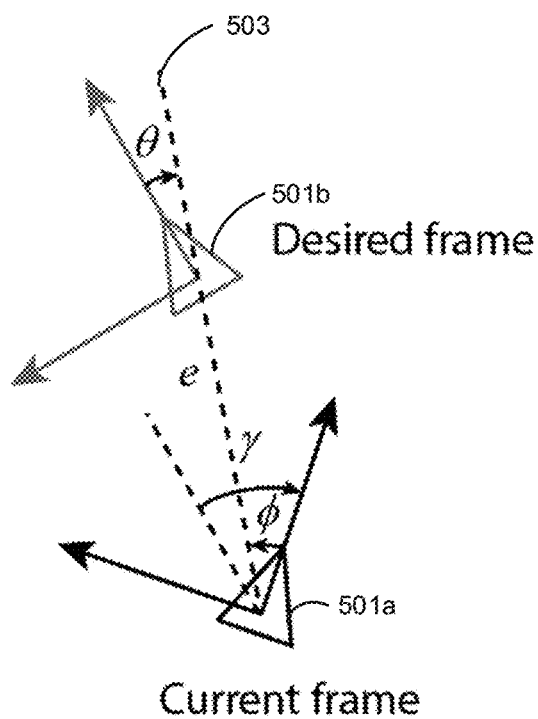
FIG. 5 illustrates a schematic diagram of an exemplary scenario for determining certain angles used in controlling a motion of a nonholonomic mobile robot, according to embodiments of the disclosure.

FIG. 4 illustrates a schematic diagram of an exemplary scenario 400 for determining whether a nonholonomic mobile robot needs to move backward, according to embodiments of the disclosure. In some embodiments, to determine whether a nonholonomic mobile robot needs to move backward, two sectors different from sectors 301a and 301b defined in FIG. 3 may be further defined. As shown in FIG. 4, a further defined sector 401a may be a dashed sector area at the back of the robot frame fixed at the starting moment or the current moment. It may be referred to as the current back sector and be specified by radius $r_b$ and angle $\alpha_b$, as shown in the figure. The other sector 401b, which may be referred to as the desired front sector, is a dashed sector area in the front of a goal pose (which may be either transition_goal or final_goal). Sector 401b may be specified by radius $r_f$ and angle $\alpha_f$, as shown also in FIG. 4. Each of the sectors 401a and 401b may be centered at the x-axis of the robot frame. If the current frame (i.e., the nonholonomic mobile robot at the current pose) is located inside the desired front sector, and the desired frame (i.e., the nonholonomic mobile robot at the goal pose (either transition_goal or final_goal)) is located inside the current back sector, the backward motion may be then enabled, to allow the nonholonomic mobile robot to move backward towards the goal of the predicted motion. Otherwise, the backward motion is disabled, and the nonholonomic mobile robot needs to move forward to the goal in the predicted incoming motion.

In some embodiments, to enable the backward motion, certain motion parameters need to be modified so that the nonholonomic mobile robot moves backward instead of moving forward. For instance, angle ϕ and angle θ shown in FIG. 5 need to be clipped to facilitate the backward motion. Here, angle ϕ may be defined as an angle between the x-axis of the current frame and a line 503 extending from the x- and y-axes of a current frame 501a towards the x- and y-axes of a desired frame 501b, and angle θ may be defined as an angle between the x-axis of the desired frame and the line 503. Angle ϕ and angle θ can be any value between $-\pi$ and $\pi$, depending on whether a nonholonomic mobile robot will move backward or forward. That is, $-\pi \leq \phi \leq \pi$ and $-\pi \leq \theta \leq \pi$. The positive and negative value of angle ϕ and angle θ may be defined based on whether line 503 lies on the clockwise side or anti-clockwise side of the x- and y-axes of the current frame or the desired frame. For instance, angle ϕ in FIG. 5 has a negative value while angle θ in FIG. 5 has a positive value.

In some embodiments, motion-planning module 140 may use the following algorithm to clip angle ϕ and angle θ:

ϕ=ϕ+π if ϕ<−π/2;

ϕ=ϕ−π if ϕ>π/2;

θ=θ+π if θ<−π/2; and

θ=θ−π if θ>π/2.

After angle clipping, the nonholonomic mobile robot may be controlled to move backward instead of moving forward.

Referring back to FIG. 2, at step 207, motion-planning module 140 may determine whether to move the nonholonomic mobile robot backward. If it is determined to move the nonholonomic mobile robot backward in the predicted motion, at step 209, motion-planning module 140 may clip angle ϕ and angle θ to allow the nonholonomic mobile robot to move backward in the predicted motion. If not, angle ϕ and angle θ will not be clipped so that the nonholonomic mobile robot is controlled to move forward.

At step 211, the nonholonomic mobile robot may be then controlled to move forward or backward towards the goal pose (either the transition goal pose or the final goal pose according to the predicted motion). As indicated in FIG. 2, mobile robot controller 106, including certain controllers and/or actuators, may be employed to control the nonholonomic mobile robot to move to the goal pose according to the predicted motion. The controllers and/or actuators included in mobile robot controller 106 may control the motion parameters of the nonholonomic mobile robot through continuous regulation, as described more in detail below in FIG. 6.

Figure 6:
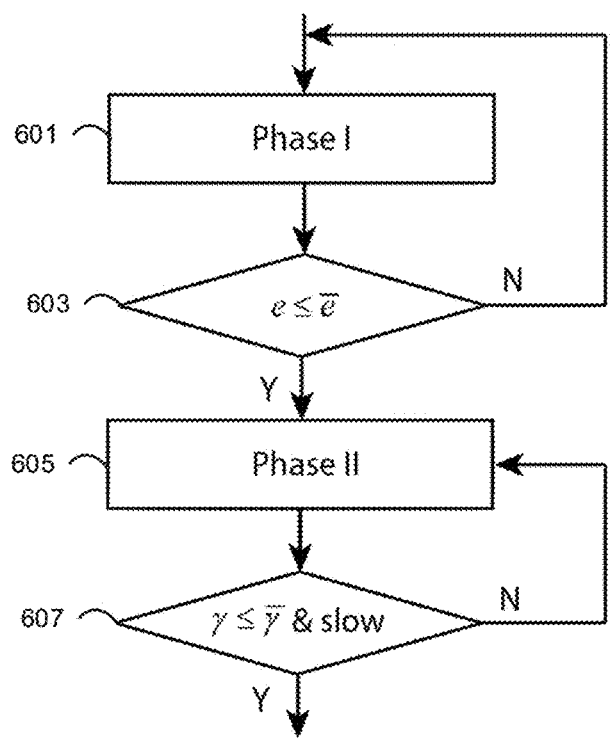
FIG. 6 shows a flow chart of an exemplary control scheme for controlling a nonholonomic mobile robot to move through two different phases, according to embodiments of the disclosure.

FIG. 6 shows a flow chart of an exemplary control scheme 600 for controlling a nonholonomic mobile robot to move through two different phases, according to embodiments of the disclosure. As shown in the figure, two different phases may be involved in the continuous regulation control scheme. In phase I, which may be also referred to as "coarse regulation," the nonholonomic mobile robot may be controlled, at step 601, to utilize a continuous regulation control scheme to park at a proximity to a goal pose (which may be a transition goal pose or final goal pose) up to minimum toleration on translation $\bar{e}$. That is, the nonholonomic mobile robot is controlled to move until e≤$\bar{e}$ as indicated by decision box 603, where $\bar{e}$ is a threshold that may be predefined by a user or determined through certain means. The control scheme used by mobile robot controller 160 at phase I may be as follows:

$v = k_2 e \cos\phi$; and $w = k_1\phi + k_2 \frac{\cos\phi \sin\phi}{\phi}(\phi + k_3\theta)$, when $|\phi| > \varepsilon$, or $w = k_1\phi + k_2 k_3 \theta \cos\phi$, when $|\phi| \leq \varepsilon$.

Here, v and w are the velocity and angular speed for moving the nonholonomic mobile robot to the target pose (which may be a transition goal pose or a final goal pose), $\varepsilon = 1e-3$ is a small positive, and $k_1$, $k_2$ and $k_3$ are constants that may be predefined by a user or may be determined through other means.

In phase II, which may be also referred to as "fine tune," the nonholonomic mobile robot may be controlled, at step 605, to rotate to reduce the orientation error γ until the orientation error is smaller than a threshold $\bar{\gamma}$. In addition, the angular speed w may be smaller than a given threshold to end the mobile robot controller. That is, the nonholonomic mobile robot may be controlled to rotate until γ≤$\bar{\gamma}$ and w≤$\bar{w}$, as indicated by decision box 607 in FIG. 6. Here, each of $\bar{\gamma}$ and $\bar{w}$ is a threshold that may be predefined by a user or may be determined through other means. The control scheme used by mobile robot controller 160 at phase II may be as follows:

v=0; and w=−PID(γ).

Here, PID(•) denotes the proportional-integral-derivative control (PID) control, a control loop mechanism employing feedback that is used in control systems and other applications requiring continuously modulated control.

As can be seen from FIG. 6 (e.g., from the control schemes in phase I and phase II), when mobile robot controller 160 controls the nonholonomic mobile robot to move along a predicted moving route, the nonholonomic mobile robot may be controlled to rotate simultaneously. Therefore, the nonholonomic mobile robot is controlled to move to a goal pose (either a transition goal pose or a final goal pose) by converging the nonholonomic mobile robot to a set of states corresponding to the goal pose simultaneously. That is, the nonholonomic mobile robot is controlled to converge to the set of states corresponding to the goal pose by a single mobile robot controller 160 without requiring to switch between different controllers. Therefore, time is saved, and the efficiency is increased through the control schemes described in FIG. 6.

Referring back to FIG. 2, after controlling the nonholonomic mobile robot to move to a goal pose (either a transition goal pose or a final goal pose) through the predicted motion at step 211, motion-planning module 140 then determines whether a next goal pose is expected at step 213. For instance, motion-planning module 140 may determine whether the incoming motion is a motion from a transition goal pose to a final goal pose. If it is determined that the incoming motion is not from a transition goal pose to a final goal pose, it means the previous motion is a motion to the final goal pose, and the nonholonomic mobile robot is already controlled to the move to the final goal pose. Therefore, there is no additional action taken by motion-planning module 140, as indicated by arrow 215. However, if it is determined that the incoming motion is a motion from a transition goal pose to a final goal pose, motion-planning module 140 may return to step 207 to determine whether a moving forward is necessary for the nonholonomic mobile robot to move to the final goal pose. If it is determined that the nonholonomic mobile robot needs to move backward at step 207, angle clipping may be performed at step 209, as previously predicted. If not, the nonholonomic mobile robot may be controlled to move forward to the final goal pose. No matter what direction the nonholonomic mobile robot is controlled to move, motion-planning module 140 may control the nonholonomic mobile robot to move to the final goal pose through mobile robot controller 106. The specific process for moving the nonholonomic mobile robot through mobile robot controller 106 has been described earlier with reference to FIG. 6, detail of which will not be repeated here.

Based on the above descriptions, it can be seen that, through control schemes detailed in FIG. 2, a nonholonomic mobile robot may be controlled to move to a final goal pose more naturally and smoothly and with higher efficiency when compared to other existing methods. For instance, by introducing a transition goal pose at step 205, a nonholonomic mobile robot may be controlled to move to a transition goal pose before moving to a final goal pose, which may avoid a large rotation torque of the nonholonomic mobile robot caused by an abrupt change of the rotational motion of the nonholonomic mobile robot under certain circumstances (e.g., the final goal pose is close to the left or right side of the current pose). For another instance, by bringing into a moving backward capacity at step 207, a nonholonomic mobile robot may be controlled to move backward when necessary, which then allows the nonholonomic mobile robot to move smoother, more naturally, and with higher efficiency. Further, by converging a nonholonomic mobile robot to a set of states corresponding to a goal pose simultaneously, the nonholonomic mobile robot does not need to switch between different controllers, which also saves time and increases the efficiency of the motion of the nonholonomic mobile robot. Demonstration of such advanced motions of nonholonomic mobile robots may be found from certain simulated motions in FIGS. 7A-7B.

Figure 7A:
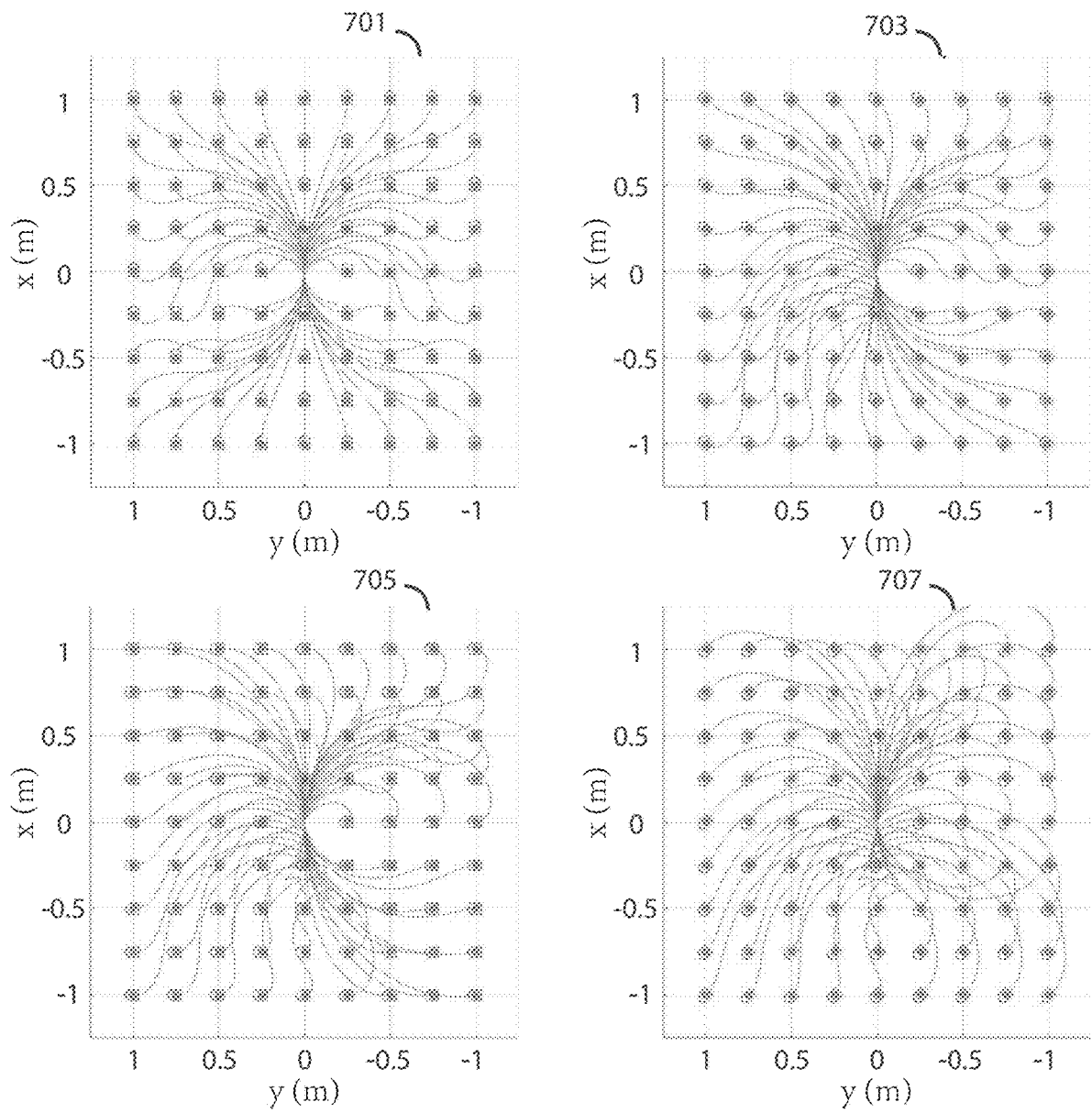
FIGS. 7A-7B collaboratively illustrate some exemplary simulated motions of a nonholonomic mobile robot, according to embodiments of the disclosure.
Figure 7B:
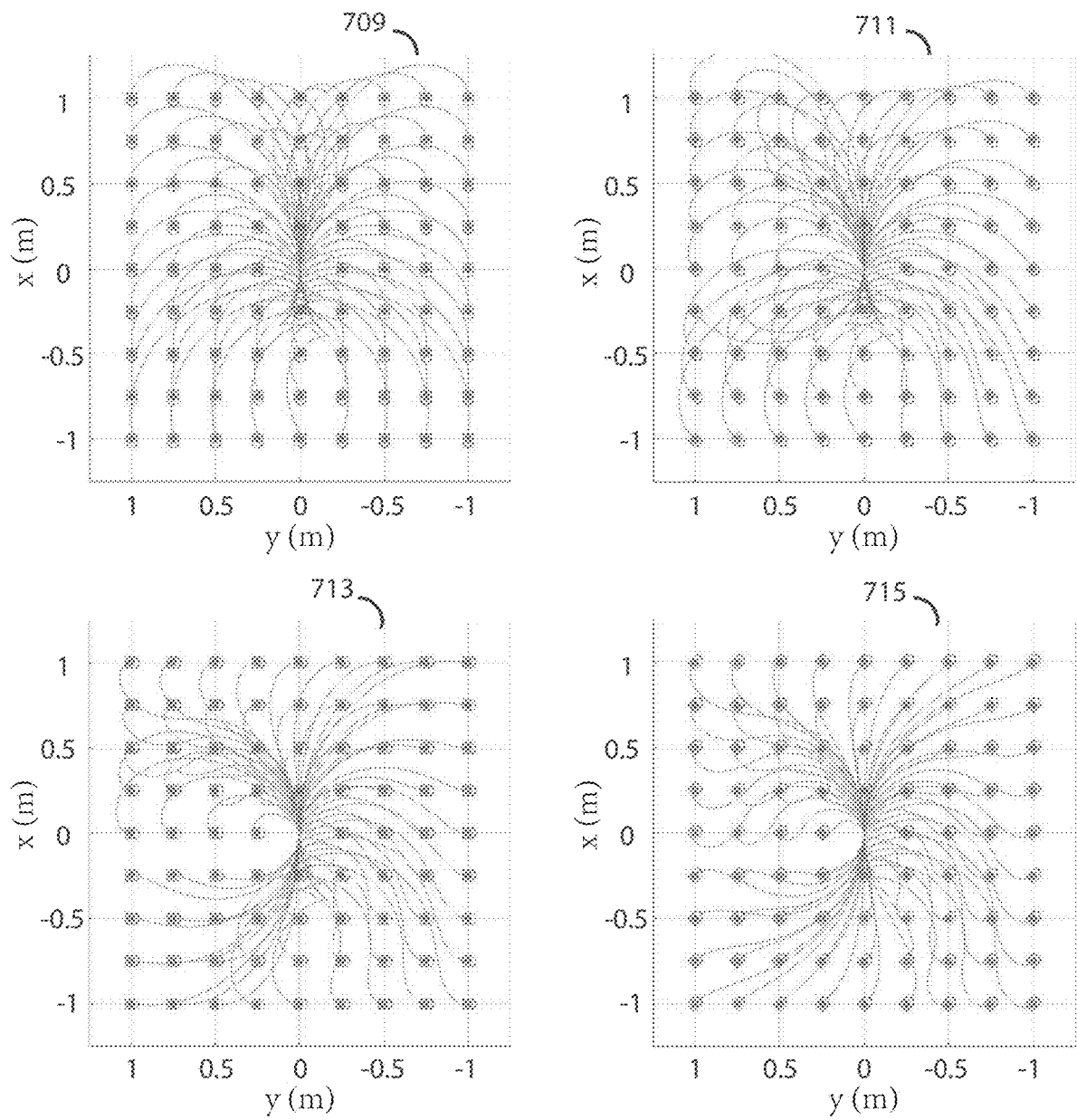

FIGS. 7A-7B collaboratively illustrate some exemplary simulated motions of a nonholonomic mobile robot, according to embodiments of the disclosure. In graph 701 shown in FIG. 7A, a nonholonomic mobile robot at (0 m, 0 m, 0 deg) is expected to move to a series of target poses at a 0-degree orientation. As can be seen from graph 701, when following the control schemes described in FIGS. 2-6, a nonholonomic mobile robot may be controlled to move smoothly and naturally to the series of target poses at the 0-degree orientation. In addition, the full states (x- and y-axes and orientation) may be converged simultaneously when the nonholonomic mobile robot follows the control schemes described in FIGS. 2-6. Graphs 703, 705, 707, 709, 711, 713, and 715 further illustrate simulated motions of a nonholonomic mobile robot to a similar series of target poses at 45-degree, 90-degree, 135-degree, 180-degree, −135-degree, −90-degree, and −45-degree orientation, respectively. From these graphs, it can be seen that, through the disclosed method, a nonholonomic mobile robot may be controlled to move to different target poses with different orientations smoothly and naturally, and the nonholonomic mobile robot can move forward or backward. In addition, a higher efficiency may be achieved in these simulated motions, since the full states (x- and y-axes and orientation) are converged simultaneously when the nonholonomic mobile robot follows the control schemes, as described earlier in FIGS. 2-6, and as further described in FIG. 8 in which a specific process for moving a nonholonomic mobile robot to a final goal pose is illustrated.

Figure 8:
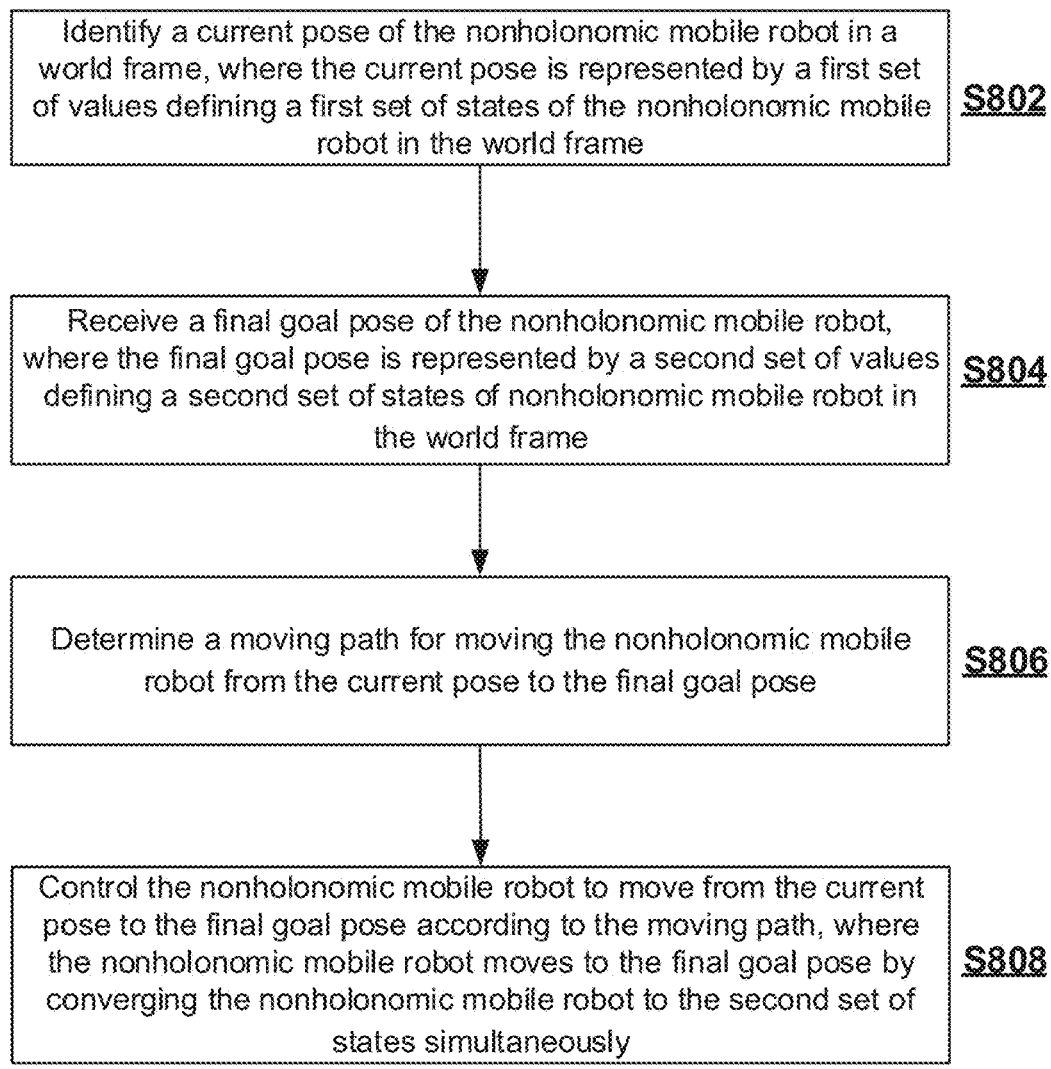
FIG. 8 illustrates a flow chart of an exemplary method for controlling a motion of a nonholonomic mobile robot, according to embodiments of the disclosure.

FIG. 8 shows a flow chart of an exemplary method 800 for controlling a motion of a nonholonomic mobile robot, according to embodiments of the disclosure. In some embodiments, method 800 may be performed by various components of control system 100, e.g., navigation module 120, sensing module 130, motion-planning module 140, and mobile robot controller 160. In some embodiments, method 800 may include steps S802-S808. It is to be appreciated that some of the steps may be optional. Further, some of the steps may be performed simultaneously, or in a different order than that shown in FIG. 8.

At step S802, control system 100 (e.g., navigation module 120 of control system 100) may identify a current pose of a nonholonomic mobile robot (e.g., nonholonomic mobile robot 180) in a world frame, where the current pose may be represented by a first set of values defining a first set of states of the nonholonomic mobile robot in the world frame. For instance, the current pose may be represented by x- and y-axes and the orientation of the nonholonomic mobile robot in the world frame, in a current robot frame, or in another different frame (e.g., in a target pose frame). Other different frames may be also used as a reference frame as soon as a frame can be used to locate a nonholonomic mobile robot with certain values in translation (e.g., x- and y-axes) and orientation. In some embodiments, different techniques may be employed to determine the current pose of the nonholonomic mobile robot. For instance, navigation module 120 may include a wheel odometry combined with a LiDAR-based SLAM technique to localize the mobile robot's current pose or initial pose. The update rate of the wheel odometry used for localization may be set to 50 Hz and SLAM may be set to 10 Hz. A Kalman filter may be applied to fuse the acquired values to obtain a fused pose as the current pose or initial pose in a frame (e.g., in the world frame).

At step S804, control system 100 may receive a final goal pose of the nonholonomic mobile robot, where the final goal pose may be represented by a second set of values defining a second set of states of nonholonomic mobile robot in the world frame. For instance, control system 100 may receive the second set of values input by a user through user interface 110. In some embodiments, the second set of values defining the second set of states of the nonholonomic mobile robot may be not directly received through user interface 110. Instead, the second set of values may be indirectly inferred based on user input from user interface 110. For instance, an address or an object/structure/facility associated with an address may be selected by a user through user interface 110, or just a touchpoint may be received from user interface 110 if an interactive map is presented in user interface 110 for a user to select a location. The second set of values may be then determined based on the user input through these different approaches. Other approaches for determining the second set of values are also possible and are contemplated. In some embodiments, the second set of values may be determined even without user input under as described earlier.

At step S806, control system 100 then determines a moving path for moving the nonholonomic mobile robot from the current pose to the final goal pose. For instance, motion-planning module 140 of control system 100 may apply different control schemes as described in FIGS. 2-6 to determine a moving path for moving the nonholonomic mobile robot from the current pose to the final goal pose. The moving path may include a specific route for moving the nonholonomic mobile robot to the final goal pose. For instance, motion-planning module 140 may determine whether a transition goal pose is needed before moving the nonholonomic mobile robot to the final goal pose. For another instance, motion-planning module 140 may also determine whether to move the nonholonomic mobile robot backward when moving the nonholonomic mobile robot to the final goal pose (and in some embodiments to the transition goal pose first). After determining the specific moving route, motion-planning module 140 may also determine the velocity and angular speed for the nonholonomic mobile robot to move to the final goal pose (and in some embodiments to the transition goal pose first) when determining the moving path. The specific algorithms for determining the velocity and angular speed used in controlling the motion of the nonholonomic mobile robot are described earlier in FIG. 6, details of which are not described again here.

At step S806, control system 100 may then control the nonholonomic mobile robot to move from the current pose to the final goal pose according to the moving path, where the nonholonomic mobile robot may move to the final goal pose by converging the nonholonomic mobile robot from the first set of states to the second set of states simultaneously. For instance, control system 100 may control the motion of nonholonomic mobile robot through mobile robot controller 160, which may include a set of controllers and/or actuators for controlling the motion of nonholonomic mobile robot at a specific velocity, direction, angular speed, etc. The control schemes included in control system 100 may simultaneously control the velocity, direction, angular speed, and other motion parameters so that the nonholonomic mobile robot can converge to the second set of values simultaneously, where the second set of values correspond to the second set of states defining the final goal pose of the nonholonomic mobile robot. Without requiring a change of different controllers for different states defining the final goal pose, the method disclosed herein may save time required for the nonholonomic mobile robot to move to the final goal pose, thereby increasing the efficiency of the motion of the nonholonomic mobile robot.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations may be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A method for continuous regulation of a nonholonomic mobile robot, comprising:
    identifying a current pose of the nonholonomic mobile robot in a world frame, wherein the current pose is represented by a first set of values defining a first set of states of the nonholonomic mobile robot in the world frame;
    receiving a final goal pose of the nonholonomic mobile robot, wherein the final goal pose is represented by a second set of values defining a second set of states of nonholonomic mobile robot in the world frame;
    determining a pair of arc-shaped sectors based on a predefined radius and angle in relation to the current pose of the nonholonomic mobile robot;
    determining a moving path for moving the nonholonomic mobile robot from the current pose to the final goal pose based on a location of the final goal pose in one of the pair of arc-shaped sectors identified in relation to the current pose and based on a comparison of an orientation error associated with the current pose and the final goal pose with a predefined threshold; and
    controlling the nonholonomic mobile robot to move from the current pose to the final goal pose according to the moving path, wherein the nonholonomic mobile robot moves to the final goal pose by converging the nonholonomic mobile robot from the first set of states to the second set of states simultaneously.

2. The method of claim 1, wherein each of the first and second set of states in the world frame comprises translations on x- and y-axes and an orientation of the nonholonomic mobile robot.

3. The method of claim 1, wherein determining the moving path for moving the nonholonomic mobile robot from the current pose to the final goal pose based on the location of the final goal pose in one of the pair of arc-shaped sectors identified in relation to the current pose and based on the comparison of the orientation error associated with the current pose and the final goal pose with the predefined threshold comprises:
    determining whether a transition goal pose is needed for the nonholonomic mobile robot to move to the final goal pose based on the location of the final goal pose identified in relation to the current pose and the comparison of the orientation error associated with the current pose and the final goal pose with the predefined threshold.

4. The method of claim 3, wherein determining whether a transition goal pose is needed for the nonholonomic mobile robot to move to the final goal pose based on the location of the final goal pose in one of the pair of arc-shaped sectors identified in relation to the current pose and based on the comparison of the orientation error associated with the current pose and the final goal pose with the predefined threshold comprises:
    determining whether the orientation error associated with the current pose and the final pose is less than the predefined threshold;
    determining whether the final goal pose is located in an arc-shaped sector on a lateral side of the nonholonomic mobile robot at the current pose, wherein the arc-shaped sector has a predefined angle and radius; and
    if the orientation error is less than the predefined threshold and the final goal pose is located in the arc-shaped sector, determining that a transition goal pose is needed for the nonholonomic mobile robot to move to the final goal pose.

5. The method of claim 3, further comprising:
    in response to that the transition goal pose is needed, controlling the nonholonomic mobile robot to move from the current pose to the transition goal pose before moving to the final goal pose.

6. The method of claim 3, further comprising:
    in response to that the transition goal pose is not needed, controlling the nonholonomic mobile robot to move from the current pose directly to the final goal pose.

7. The method of claim 1, wherein determining the moving path for moving the nonholonomic mobile robot from the current pose to the final goal pose further comprises:
    determining whether the nonholonomic mobile robot needs to move backward to the final goal pose; and
    if it is determined that the nonholonomic mobile robot needs to move backward to the final goal pose, controlling the nonholonomic mobile robot to move backward to the final goal pose.

8. The method of claim 7, wherein:
    the determining the pair of arc-shaped sectors comprises:
        determining an arc-shaped backside sector located on a backside of the current pose; and
        determining an arc-shaped front sector located on a front of the final goal pose, and
    the determining whether the nonholonomic mobile robot needs to move backward to the final goal pose comprises:
        if the nonholonomic mobile robot at the current pose is located in the arc-shaped front sector and the nonholonomic mobile robot at the final goal pose is located in the arc-shaped backside sector, determining that the nonholonomic mobile robot needs to move backward to the final goal pose.

9. The method of claim 1, wherein controlling the nonholonomic mobile robot to move from the current pose to the final goal pose comprises:
    controlling the nonholonomic mobile robot to move from the current pose to a pose within a predetermined proximity to the final goal pose with a predefined toleration on translations; and
    controlling the nonholonomic mobile robot to rotate to reduce the orientation error to be smaller than the predefined threshold.

10. The method of claim 1, wherein the current pose of the nonholonomic mobile robot in the world frame is determined by using a wheel odometry combined with a Light Detection and Ranging (LIDAR)-based Simultaneous Localization and Mapping (SLAM) process.

11. The method of claim 1, wherein the nonholonomic mobile robot is underactuated with a number of inputs smaller than a degree of freedom.

12. A system for continuous regulation of a nonholonomic mobile robot, comprising:
at least a processor;
a memory coupled to the at least one processor, the memory storing programs that, when executed, cause the at least one processor to:
identify a current pose of the nonholonomic mobile robot in a world frame, wherein the current pose is represented by a first set of values defining a first set of states of the nonholonomic mobile robot in the world frame;
receive a final goal pose of the nonholonomic mobile robot, wherein the final goal pose is represented by a second set of values defining a second set of states of nonholonomic mobile robot in the world frame;
determine a pair of arc-shaped sectors based on a predefined radius and angle in relation to the current pose of the nonholonomic mobile robot;
determine a moving path for moving the nonholonomic mobile robot from the current pose to the final goal pose based on a location of the final goal pose in one of the pair of arc-shaped sectors identified in relation to the current pose and based on a comparison of an orientation error associated with the current pose and the final goal pose with a predefined threshold; and
control the nonholonomic mobile robot to move from the current pose to the final goal pose according to the moving path, wherein the nonholonomic mobile robot moves to the final goal pose by converging the nonholonomic mobile robot to the second set of states simultaneously.

13. The system of claim 12, wherein each of the first and second set of states in the world frame comprises translations on x- and y-axes and an orientation of the nonholonomic mobile robot.

14. The system of claim 12, wherein, to determine the moving path for moving the nonholonomic mobile robot from the current pose to the final goal pose based on the location of the final goal pose in one of the pair of arc-shaped sectors identified in relation to the current pose and based on the comparison of the orientation error associated with the current pose and the final goal pose with the predefined threshold, the programs, when executed, further cause the at least one processor to:
determine whether a transition goal pose is needed for the nonholonomic mobile robot to move to the final goal pose based on the location of the final goal pose identified in relation to the current pose and the comparison of the orientation error associated with the current pose and the final goal pose with the predefined threshold.

15. The system of claim 14, wherein, to determine whether a transition goal pose is needed for the nonholonomic mobile robot to move to the final goal pose based on the location of the final goal pose in one of the pair of arc-shaped sectors identified in relation to the current pose and based on the comparison of the orientation error associated with the current pose and the final goal pose with the predefined threshold, the programs, when executed, further cause the at least one processor to:
determining whether the orientation error associated with the current pose and the final pose is less than the predefined threshold;
determine whether the final goal pose is located in an arc-shaped sector on a lateral side of the nonholonomic mobile robot at the current pose, wherein the arc-shaped sector has a predefined angle and radius; and
if the orientation error is less than the predefined threshold and the final goal pose is located in the arc-shaped sector, determine that a transition goal pose is needed for the nonholonomic mobile robot to move to the final goal pose.

16. The system of claim 14, wherein the programs, when executed, further cause the at least one processor to:
in response to that the transition goal pose is needed, control the nonholonomic mobile robot to move from the current pose to the transition goal pose before moving to the final goal pose.

17. The system of claim 12, wherein, to determine the moving path for moving the nonholonomic mobile robot from the current pose to the final goal pose, the programs, when executed, further cause the at least one processor to:
determine whether the nonholonomic mobile robot needs to move backward to the final goal pose; and
if it is determined that the nonholonomic mobile robot needs to move backward to the final goal pose, control the nonholonomic mobile robot to move backward to the final goal pose.

18. The system of claim 17, wherein:
to determine the pair of arc-shaped sectors, the programs, when executed, further cause the at least one processor to:
determine an arc-shaped backside sector located on a backside of the current pose; and
determine an arc-shaped front sector located on a front of the final goal pose; and
to determine whether the nonholonomic mobile robot needs to move backward to the final goal pose, the programs, when executed, further cause the at least one processor to:
if the nonholonomic mobile robot at the current pose is located in the arc-shaped front sector and the nonholonomic mobile robot at the final goal pose is located in the arc-shaped backside sector, determine that the nonholonomic mobile robot needs to move backward to the final goal pose.

19. A nonholonomic mobile robot, comprising a processor and a controller coupled to the processor, wherein
the processor is configured to:
identify a current pose of the nonholonomic mobile robot in a world frame, wherein the current pose is represented by a first set of values defining a first set of states of the nonholonomic mobile robot in the world frame;
receive a final goal pose of the nonholonomic mobile robot, wherein the final goal pose is represented by a second set of values defining a second set of states of nonholonomic mobile robot in the world frame;
determine a pair of arc-shaped sectors based on a predefined radius and angle in relation to the current pose of the nonholonomic mobile robot; and
determine a moving path for moving the nonholonomic mobile robot from the current pose to the final goal pose based on a location of the final goal pose identified in relation to the current pose and a comparison of an orientation error associated with the current pose and the final goal pose with a predefined threshold; and
the controller is configured to:
control the nonholonomic mobile robot to move from the current pose to the final goal pose according to the moving path, wherein the nonholonomic mobile robot moves to the final goal pose by converging the nonholonomic mobile robot to the second set of states simultaneously.

\* \* \* \* \*